Figure 1:
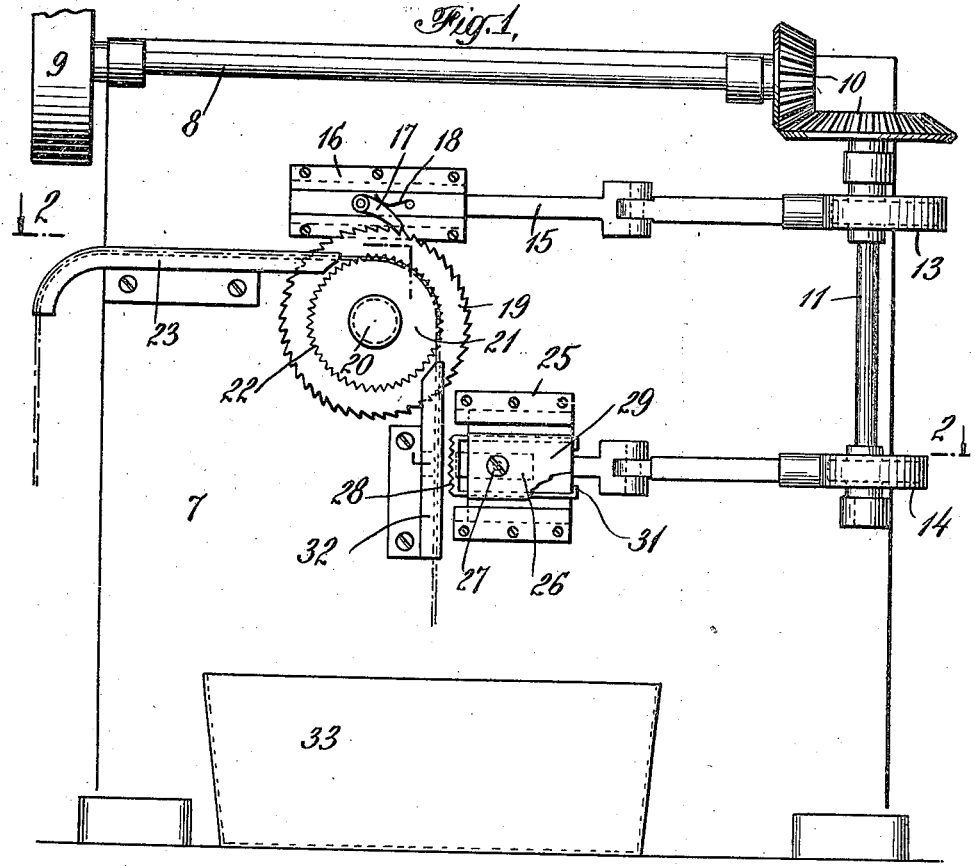

Mar. 6, 1923.

O. SODERSTROM 1,447,736

LINK MESH CUTTING MACHINE

Filed July 11, 1921  2 sheets-sheet 1

Inventor
Oscar Soderstrom
By his Attorneys
Pennie, Davis, Marvin & Edmonds

Mar. 6, 1923.
O. SODERSTROM
1,447,736
LINK MESH CUTTING MACHINE
Filed July 11, 1921
2 sheets-sheet 2
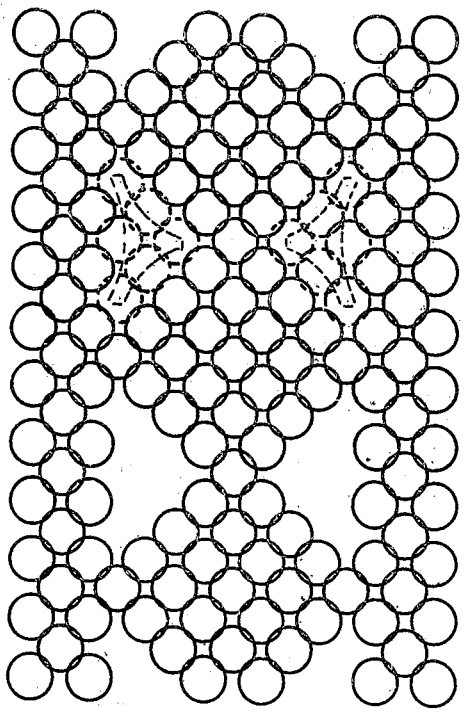
Fig. 3,
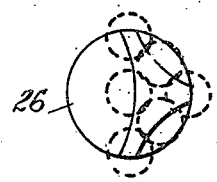
Fig. 4,
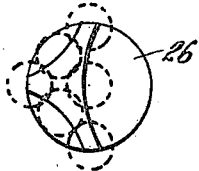
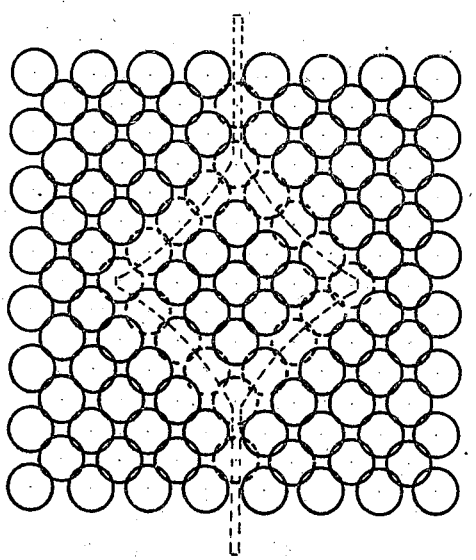
Fig. 5,
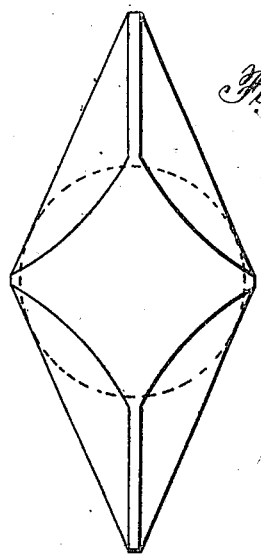
Fig. 6
Inventor
Oscar Soderstrom
By his Attorneys
Rennie, Davis, Marvin & Edmonds Patented Mar. 6, 1923.

1,447,736

UNITED STATES PATENT OFFICE.

OSCAR SODERSTROM, OF PLAINVILLE, MASSACHUSETTS, ASSIGNOR TO WHITING & DAVIS COMPANY, A CORPORATION OF MASSACHUSETTS.

LINK-MESH-CUTTING MACHINE.

Application filed July 11, 1921. Serial No. 483,720.

*To all whom it may concern:*

Be it known that I, OSCAR SODERSTROM, residing at Plainville, in the county of Norfolk, State of Massachusetts, have invented certain new and useful Improvements in Link-Mesh-Cutting Machines; and I do hereby declare the following to be a full, clear, and exact description of the invention, such as will enable others skilled in the art to which it appertains to make and use the same.

This invention relates to machines for cutting link mesh and particularly to machines for cutting mesh in such a way as to provide pieces or strips of attractive designs for use in making purses, or for use as a fringe for a purse, or as a necklace, or a similar use.

A machine constructed in accordance with the invention includes a support for the mesh to be operated upon, arranged for moving the piece of mesh continuously or intermittently so as to present surfaces on the piece of mesh successively to a cutting tool which is operated periodically to advance it into coaction with the mesh to be cut. In cutting a piece of mesh it is of the utmost importance that links which are not cut and which are to remain in the piece of mesh to be used should not be subjected to strain. This is particularly true of the very fine mesh now so largely used, the rings in which are made from wire of so small diameter that they are very frail and may be broken or distorted if subjected to strain. This makes it of the utmost importance to insure that the reciprocating tool employed for cutting the mesh shall contact with only those rings of the piece of mesh which are to be cut and removed from the piece. In order to accomplish this, the machine of the present invention includes an aligning device associated with the reciprocating cutting tool and adapted to be moved into contact with the mesh in advance of the cutting tool. This aligning device is provided with a surface formed for coaction with the mesh so that when it is moved into contact with the mesh it positions the latter with great accuracy so that the advance movement of the cutting tool will carry it into engagement with the rings that are to be cut but no others.

The cutting tools employed in the machine may have cutting faces of various shapes so as to produce pieces of mesh of fanciful design adapted for a particular purpose such as a fringe or a strip for a necklace. Thus the cutting tool may have a cutting face in the shape of a diamond for producing openings of diamond shape in a piece of mesh. After each cutting operation of this tool and while the tool is being withdrawn, the support for the piece of mesh would be operated to move the mesh along a predetermined amount so that the cutting operations would be performed in the periods of rest of the step by step movement of the mesh. This would produce a piece of mesh having diamond shaped openings in it at regular intervals throughout its length. Such a diamond shaped tool might have elongated cutting edges extending in alignment from opposite corners of the diamond. If such a tool were used, and the step by step movement of the mesh were of the proper length, a strip of mesh would be cut off by the successive operations of the cutting tool, and this strip would have indentations in its edge at regular intervals throughout its length. In this way a thin strip of a decorative appearance may be produced suitable for use, for example, as a necklace or as a fringe for a mesh bag.

Figure 2:
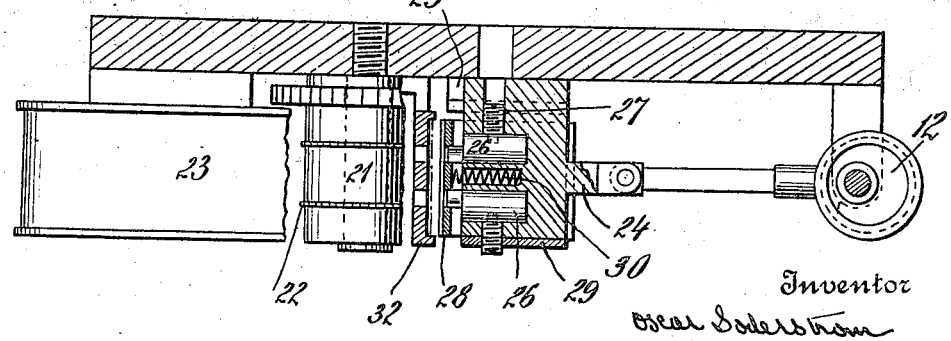

The preferred embodiment of the invention is illustrated in the accompanying drawings in which Figure 1 is an elevation of the machine; Figure 2 is a view along the line 2—2 of Figure 1; Figures 3 and 5 are views of pieces of mesh with outlines of cutting tools thereon to illustrate the operation of the machine; and Figures 4 and 6 are views of the ends of cutting tools which may be employed in the operation of the machine.

Referring to these drawings, 7 indicates a support on which the parts of the machine are mounted. This support is provided with bearings for a shaft 8 driven from any suitable source of power by a pulley 9. Beveled gears 10 connect this shaft with a vertical shaft 11 also mounted in bearings on the support 7. On this shaft 11 are two eccentrics 12 provided with eccentric straps 13 and 14. The strap 13 is connected to a reciprocating slide 15 which is movable horizontally in ways 16 secured on the support 7. This slide carries a pawl 17 pressed by a spring 18 into engagement with the teeth of a ratchet wheel 19. This wheel is secured to the shaft 20 of a roller 21 which serves to support and move the piece of mesh being operated upon. In order that the piece of mesh may be moved with great accuracy and positioned exactly at the end of each step by step movement, the supporting roller 21 is provided with teeth which project through rings of the strip of mesh. Preferably these teeth are provided on the peripheries of two wheels 22 as indicated in Figure 2. Adjacent to the roller 21 is a supporting surface 23 over which the piece of mesh moves to the roller, and this support 23 is preferably provided with flanges at its lateral edges to guide the piece of mesh accurately.

The eccentric strap 14 is connected to a reciprocating slide 24 which moves horizontally in guides 25 also secured to the support 7. This slide is provided with openings adapted to receive one or more cutting tools 26, the bodies of which are inserted in the openings in the slide and are secured therein by set screws 27.

The reciprocating slide 24 also carries an aligning device 28, the surface of which is formed to coact with the surface presented by the mesh to be cut, so that when this aligning device moves into contact with the piece of mesh it will cause the mesh to assume a position which will insure engagement of the cutting tools 26 with the rings which are to be cut and eliminate the danger of the tools engaging any of the rings which are to remain in the piece. As shown in the drawings, this aligning device is in the form of a rectangular frame enclosing the slide 24 and is adapted to move horizontally relatively to the slide. It is held in position upon the block which constitutes the slide 24 by a sheet metal piece 29 which is secured to the block. A coiled spring 30 is seated in an opening in the slide block 24 and its outer end bears against the inner side of the aligning device 28. This spring operates to force the aligning device to the left in Figures 1 and 2, the extent of the movement in this direction being limited by the inwardly turned ends 31 of the piece from which the aligning device is made. As is indicated in Figures 1 and 2, the outer face of the aligning device 28 is provided with depressions and ridges corresponding accurately to the surface presented by a piece of mesh of the type being operated on. As shown in Figure 2, the face plate of the aligning device is provided with openings corresponding in size and shape to the projecting ends of the cutting tools 26.

Opposite the reciprocating slide 24 and the aligning device 28 is a vertically disposed supporting plate 32 which supports the piece of mesh while the cutting tools are operating upon it. This plate is provided with lateral flanges which guide the piece of mesh and has openings through it to receive the ends of the cutting tools.

Below the support 32 is a receptacle 33 to receive the mesh after it has been operated upon. Figure 3 shows a piece of mesh in the form of a long narrow strip and the two tools which may be used in connection therewith. As shown in Fig. 4, each tool has a cylindrical body 26 adapted to be inserted in the opening in the reciprocating slide and on its end an extension which is of generally triangular shape, each of the three sides being slightly concave. These two cutting tools are adapted to cooperate with the mesh in the manner indicated by the dotted lines on the upper part of Figure 3, thereby cutting rings of the mesh, which, when removed, provide openings as indicated in the lower part of Figure 3.

In the operation of the machine using tools of this character, the end of a long strip of mesh would be laid over the support 23, the roller 21 and the vertical support 32 and the teeth 22 of roller 21 would be passed through rings of the mesh. Then on starting the machine in operation the reciprocating slide 15, pawl 17 and wheel 19 would operate to turn the roller 21 step by step. Each step by step movement of the roller would advance the piece of mesh over the supports 23 and 32 a predetermined amount, at the end of which the mesh would come to rest. Also, the operation of the machine would cause reciprocation of the slide 24 and the parts carried thereby. These operations are so timed that the advance movement of the slide 24 would take place immediately after the step movement of the piece of mesh had been completed. This advance movement of the slide would result first on contact of the surface of the aligning device 28 with the mesh and the ridges and depressions presented by this surface would pass into the corresponding ridges and depressions in the piece of mesh so as to move the mesh, or certain of the rings thereof, such minute amounts as might be necessary to position the mesh with absolute accuracy. When the forward movement of the aligning device 28 is resisted by reason of its contact with the mesh on the support 32, the aligning device moves relatively to the block 24, depressing the spring 30. In other words, the movement of the slide 34 continues and the ends of the cutting tools 26 are carried through the openings in the aligning device 28 and into contact with the rings of the piece of mesh which are to be cut. This cutting operation is repeated after each step by step movement of the mesh resulting in the production of a long strip of mesh with pairs of triangular openings at regular intervals throughout its length. It will be appreciated that by the selection of tools of the appropriate shape and by regulating the extent of the step by step movement of the mesh, many different fanciful effects can be produced in the mesh.

In Figure 6 is shown a cutter tool having a cutting edge in the form of a rectangle, though with slightly concaved sides as in Figure 4, and with cutting edges extended from opposite corners. When using this tool a rectangular hole is cut in the mesh as is indicated in Figure 5 and in addition slits are made extending in opposite directions from this hole. The length of the straight cutting edges of this tool and the magnitude of the movements of the mesh are such that the cuts made in successive reciprocations of the cutting tool intersect. In this way a strip of any desired width may be cut off from a piece of mesh having indentations in its edge at intervals throughout the length of the strip. Such a strip may be employed as a fringe for a mesh bag or any similar purpose.

Figures 3 to 6 inclusive, indicate the wide range of fanciful effects which may be produced in the operation of the machine by the selection of cutting tools of the appropriate shape and by regulating as desired the advance of the strip of mesh each step.

The machine is particularly adapted for use in connection with very fine mesh made from wire which possesses relatively little strength by reason of its small diameter. This results from the provision of an aligning device which positions the mesh at the points where the cuts are to be made with great accuracy. By reason of this provision, the danger of imposing a strain on the links other than those which are to be made from the piece, is eliminated.

I claim:

1. A machine for cutting link mesh, comprising the combination of a support for a piece of link mesh, means for moving the mesh over the support step by step, a reciprocating cutting tool for cutting rings of the mesh in the intervals of rest of the step-by-step movement, and means for guarding against injury to rings of the mesh adjacent to those which are to be cut.

2. A machine for cutting link mesh, comprising the combination of a cutting tool, a support for the mesh to be cut, means for advancing the mesh a predetermined amount into approximate position for cutting, means for thereafter alining and supporting the mesh so as to assure protection of the mesh, and means for moving the cutting tool into engagement with the mesh.

3. A machine for removing certain rings from link mesh without injury to other rings of the mesh, comprising a cutting tool, a support for the mesh to be cut, means for periodically moving the mesh step-by-step over the support operatively associated with means for safeguarding injury to the mesh and for cutting certain rings of the mesh during periods of rest of the step-by-step movement.

4. A machine for cutting link mesh, comprising the combination of a support, means for moving a piece of mesh over the surface of the support, a reciprocating cutting tool, an alining device provided with a surface corresponding in shape to the surface presented by the mesh, means for moving the alining device into contact with the mesh, and means for thereafter moving the cutting tool into engagement with the mesh.

5. A machine for cutting link mesh, comprising the combination of a support, means for moving the piece of mesh over the surface of the support, a reciprocating cutting tool, an alining device actuated by the cutting tool and provided with a surface formed to correspond with the surface presented by the mesh, a spring constituting a yielding support for the alining device for holding it normally in advance of the cutting edges of the cutting tool, and means for reciprocating the tool and the alining device carried thereby to carry them into engagement with the mesh.

In testimony whereof I affix my signature.

OSCAR SODERSTROM.